United States Patent Office.

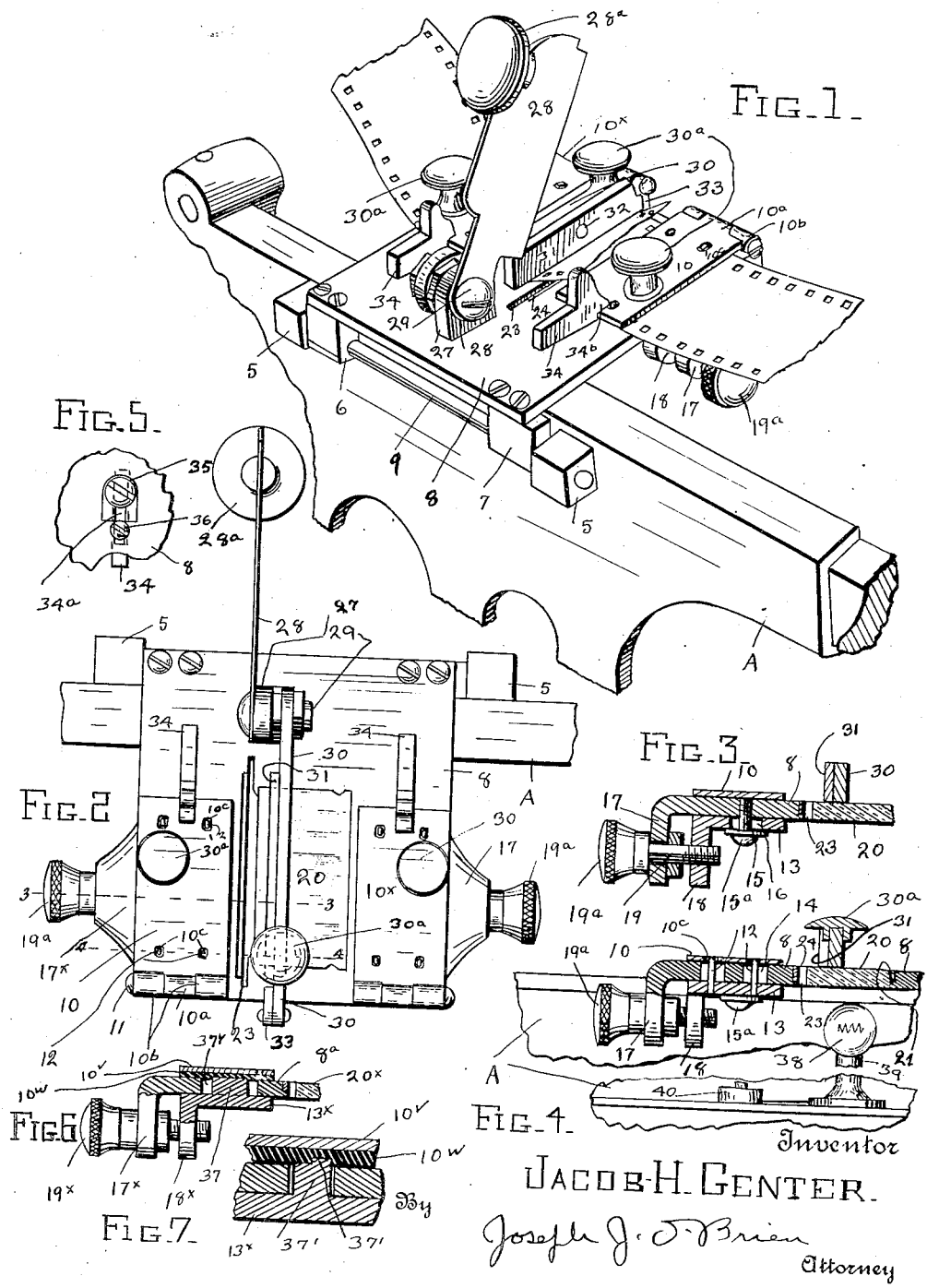

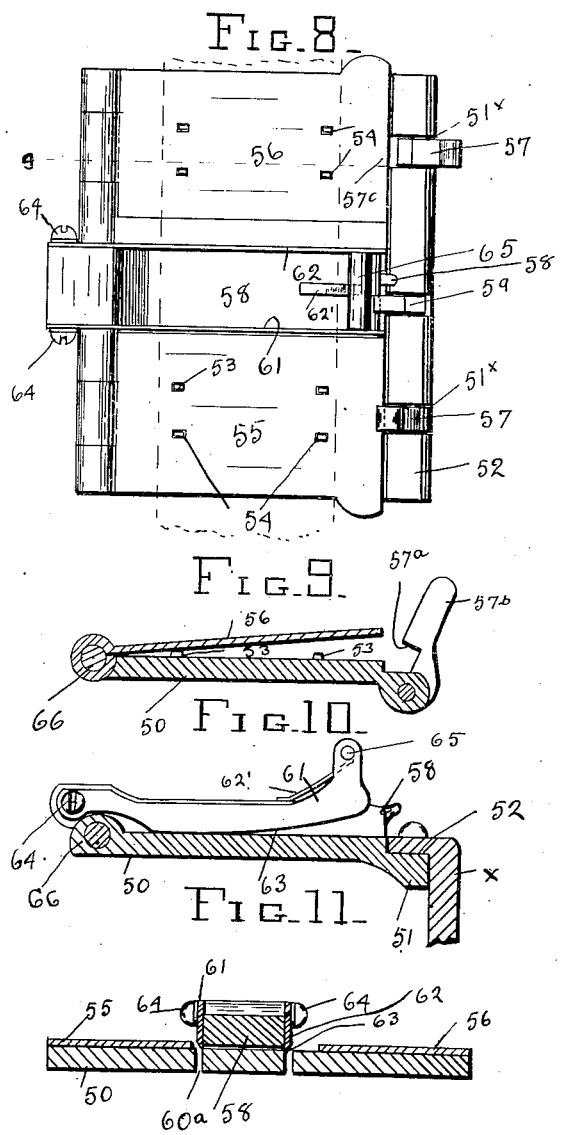

JACOB H. GENTER, OF NEWBURGH, NEW YORK; HELEN C. GENTER (NOW BY MARRIAGE HELEN C. HART) EXECUTRIX OF SAID JACOB H. GENTER, DECEASED.

FILM MENDING AND INSPECTING TABLE.

1,331,563.

Specification of Letters Patent.

Patented Feb. 24, 1920.

Application filed November 23, 1916. Serial No. 133,088.

*To all whom it may concern:*

Be it known that I, JACOB H. GENTER, a citizen of the United States, residing at Newburgh, in the county of Orange and State of New York, have invented certain new and useful Improvements in Film Mending and Inspecting Tables, of which the following is a specification.

This invention relates to improvements in film mending and inspecting devices and is designed as an attachment to the film rewinders shown in copending applications for Letters Patent (filed by me, to-wit Serial No. 41,211, filed July 21, 1915, and Serial No. 92,332, filed April 19, 1916).

The present invention relates to improvements in the mending table, which improvements include means for quickly and properly inspecting the traveling film, and closely watching the position of the fractured film during the mending operation, and means for enabling the operator to make a perfect joint, so as to insure accurate framing of the joined film strip.

From careful study of the difficulties arising during the projection use of film, I have discovered that the position of the sprocket holes with respect to the edges of the individual pictures varies, and as a result joining of the ruptured film portions is rendered very difficult, to insure proper framing of the completed picture. After considerable study and experimenting I have devised means for adjusting the position of the film on the mending table, so as to properly aline the opposing film end portions, to insure proper framing when the film end portions are cemented to each other.

To join separated film portions it is necessary to provide a lap edge portion, and the emulsified face of the film which contacts with the opposing film end portion should be effectively scraped to insure direct contact of film to film and durable jointage or cementing. I have devised, therefore, a film clamp and an adjustable gaging device, whereby a proper joint lap is provided and the emulsion may be manually scraped off this joint lap, and this accomplished without danger to the framing scheme so necessary to satisfactory projection.

With the above and other objects in view the invention comprises certain new and useful combinations, constructions, and arrangements of parts, clearly described in the following specification and fully illustrated in the accompanying drawings, in which:—

Figure 1 is a perspective view of my improved mending table shown in operative position on a rewinder.

Fig. 2 is a plan view showing the mending table shifted to inoperative position.

Fig. 3 is a transverse sectional view taken on line 3—3 of Fig. 2.

Fig. 4 is a detail sectional view taken on line 4—4 of Fig. 2.

Fig. 5 is a detail bottom plan view of the sliding connection of one of the latches.

Fig. 6 is a detail sectional view showing the relation of the sight glass of the mending table to the illuminating means.

Fig. 7 is a detail sectional view of a slightly modified film retaining construction.

Fig. 8 is a plan view of a modified form of my improved cutting and mending table.

Fig. 9 is a transverse sectional view taken on line 9 of Fig. 8.

Fig. 10 is a transverse sectional view showing the mounting for the cutting knives.

Fig. 11 is a longitudinal sectional view showing the central clamping member and the cutting knives.

Referring to the accompanying drawings illustrating the practical embodiment of the invention A designates the frame of the rewinder, which is provided with a suitable hinge knuckle 5 to which the hinge eyes or knuckles 6 and 7 of the mending table base 8 are pivotally secured by the pintle 9.

The mending table base 8 is equipped with a film clamping plate 10, which is hinged thereto by the pintle 11, which passes through the hinge eye 10ª formed on said base 8, and through the hinge eyes 10ᵇ formed on the plate 10. The plate 10 is formed with openings 10ᶜ to receive the film positioning pins 12 secured to the plate 13, and said openings are made slightly wider than the pins 12 so that said pins will readily enter the openings.

The pins 12 project through slots 14 formed in the base 8. The plate 13 is slidably secured under the base 8 by means of the screw 15, which extends through the slot 16 formed in said plate 13, and which has a head 15ª considerable wider than said slot 16, and which head supports the plate in sliding contact with under surface of the base 8. The screw 15 is threaded in the base 8. The base 8 is formed with a pendant ear or lug 17 and the plate 13 is also formed with a pendant ear or lug 18 which confronts the lug 17. The propelling screw 19 is provided with a head 19$^a$ which is swiveled to the lug 17 and is threaded in the lug 18, so that by turning said screw the plate 13 may be shifted under the base 8.

The base 8 is provided with a relatively large centrally located opening in which the sight glass 20 is located. This glass sets on a ridge 21 formed on the base 8. A knife slot 23 is formed in the base 8 and adjacent the said slot a knife guide and cutting element 24 is located.

On the base 8 an upstanding lug 27 is provided, to which lug the knife 28 is pivotally secured by the screw pin 29. The cutting edge of the knife is adapted to enter the slot 23 and have shear engagement with the guide and cutting element 24.

To the upstanding lug 27 a clamping bar 30 is pivotally secured by the screw pin 29, and to the bar 30 a contact bar 31 is secured by a medially located pivot 32, which is secured to the side of the bar 30. When the clamping bar 30 is swung into a horizontal position the contact bar 31 will evenly contact with both side edges of the film, owing to its central pivot connection with said clamping bar. The clamping bar and the contact bar are held in clamping position by means of a latch 33 which is pivoted to the free end of said clamping bar and is adapted to latch under the base 8. The contact bar 31 is spaced laterally of the knife guide and cutting element 24 a distance sufficient to provide a lap for the film, and when the film has been adjusted under the clamping and contact bars the portion overlying the base between the contact bar and the guide 24 may be scraped with a suitable pointed instrument, to clean off the emulsion, so as to provide a clean surface for the cement, as previously explained.

The clamping bar 30 and the knife 28 are each provided with a suitable handle knob, designated 30$^a$ and 28$^a$, respectively.

On the other side of the knife and clamping bar an adjustable film positioning and clamping device, identical with that previously described, is located. This companion positioning and clamping device includes a clamping plate 10$^x$, identical with the plate 10. The plates 10 and 10$^x$ are held in clamping positions by means of the latches 34. The latches 34 are movable in slots 34$^a$ formed in the base 8, and slidably retained in said slots by means of screws 35 and 36, the screws 35 having relatively large heads slidable between the beveled guide walls of the slots 34$^a$ and the screws 36 having relatively small heads engaging the underside of the base 8 and slidable in the unbeveled portion of the slots 34$^a$. The latches 34 are each formed with a lip 34$^b$ which is adapted to slide over the slightly beveled free edge portion of the clamping plate 10, or 10$^x$, and snugly hold said plate to the base 8, and thus tightly clamp the film against the base.

By this arrangement either end portion of the separated film strip may be shifted relative to the other, or both shifted, as may be found expedient.

The use of the sprocket hole engaging pins may be dispensed with and upstanding lugs 37, may be substituted. In this case the lugs may be covered with rubber or like material, and the under side of the clamping plates 10 and 10$^x$ may be faced with rubber or like material, so that instead of an interfitting clamping action being obtained there would be a direct friction clamping action, which would permit of quicker manual shifting of the film end portions toward and away from each other. The upstanding lugs 37 may also be provided with shallow shoulders 37', whereby they will snugly engage the side edges of the film strip end portions.

In order to enable the operator to readily examine the film I provide an electric lamp or illuminating device 38 directly under the sight glass, this lamp or device 38 being shown supported on the free end of a gooseneck support 39, the base of which is secured to the base of the rewinder frame. A suitable easily operated current switch 40 is provided on the frame of the rewinder for energizing and deënergizing the lamp 38.

By the arrangement of the manually controlled illuminating device arranged directly beneath the mending table, which is equipped with a sight glass, the operator may quickly and satisfactorily study the condition of the film and adjust the separated end portions with relation to the cutting knife and then to each other, to insure accuracy in making the patch or joint, and final perfect framing.

When it is desired to operate the rewinder as usual, the mending and inspecting table may be manually shifted to an inoperative position, to one side of the path of travel of the film strip.

In Figs. 8, 9, 10 and 11 I show a modified form of my improved film mending and cutting table, originally described in a pending application (filed by me July 21, 1915, and given Serial No. 41,211), and presented here for specific protection.

Referring to these figures $x$ designates a portion of the frame of a film rewinder, to which the base member or plate 50 is connected: said member or plate 50 being formed with a downwardly offset ledge 51 which is disposed under a lateral flange 52 of the frame $x$, and secured thereto by means of screws or other fastening means.

The table member 50 extends in a horizontal plane from the frame $x$ and is provided with a series of upstanding prongs or teeth 53, which are spaced from each other to enter the sprocket teeth openings or hole formed along the side or marginal portions of the film strip. Four teeth or prongs 53 are located on each side of the central portion of the table, and are designed to enter small openings 54 formed in the clamping plates 55 and 56, which are hingedly connected to the table member 50.

The plates 55 and 56 are locked to the mending table by the latches 57, each of which is pivoted to the ledge 51, which ledge is formed with a small slot 51$^x$ for each latch. Each latch 57 is formed with a shouldered portion 57$^a$ which is adapted to engage the upper face of the film clamping plate with which it coöperates, and is also formed with an upstanding finger 57$^b$. The confronting edge portion of each plate, 55 and 56, is formed with a small edge notch 57$^c$ to receive the opposing latch 57. The film clamping plates 55 and 56 are designed to grip or clamp portions of the film adjoining a tear or break, and are spaced apart from each other to provide a clearance in which the block 58 is pivotally held. The block 58 is pivoted at its rear end to the bending table 50 and is held in snug engagement with said table by means of the latch 59, constructed and functioning like the latches previously described.

The bed or mending table 50 is formed with parallel knife slots 60$^a$, and the side edges of the block 58 are alined with the inner edges of said knife slots so as to form guides for knives 61 and 62, which are adapted to be manually depressed against the sides of the block 58 so as to enter the slots 60$^a$ and sever a film in doing so. The block 58 thus serves as a guide for the knives and a spacer therefor. The beveled lower or cutting edges of the knives are normally held above the upper face of the bed or plate 50, so as to not interfere with the passage of the film under the block 58. The block 58 is formed with a rear end projection or extension 58$^a$, and to this projection or extension the rear ends of the knives are pivotally connected by means of the screw pivots 64. The lower cutting edges of the knives are rounded so that a shear cutting action will follow the depression of the knives into the slots 60$^a$.

The forward ends of the knives are connected to each other by means of the handle 65, the underside of which is engaged by means of the spring 62', the upper end of which is secured to the handle and the lower end of which is designed to bear against the upper face of the block 58.

When a new joint is to be formed in the film strip to eliminate a mutilated film portion, or to join separated film portions the knives 61 and 62 function to cut the film squarely at right angles to its longitudinal edges. The knives 61 and 62 are spaced apart from each other a distance less than the width of a single picture on the standard projection film, so that when the film is locked to the teeth or prongs 53 the knives will cut a portion of the film less than the width of one of the pictures, thus leaving a portion of the film including a portion of the picture eliminated: and this film portion serves as an attaching flap to form the new joint. The cement is applied to this film portion or attaching flap and the adjoining film portions are then placed in contact, and the contacting joint forming portions are then clamped against the mending table 50 by the block 58 and the latch 59. In this manner the danger of uniting the separated sections of the film, so as to change the relation of the picture to the feed sprockets, is avoided and the mended film strip will pass through the feeding mechanism with a correct "framing" of the projected pictures.

The necessity of rapid and accurate mending work calls for means for quickly and accurately handling the film strip, and my improved mending and cutting table provides this means.

Various changes in the construction, arrangement and proportioning of the details may be resorted to without departing from the spirit of my invention, as defined in the following claims.

Having described my invention, I claim and desire to secure by Letters Patent:—

1. The combination with a rewinder for films having means for supporting film reels in line with each other, and means for effecting the winding of the film from one reel to the other, of a mending table, supporting means for said table located entirely at one side of the longitudinal path of travel of the film between the film reels, and pivotal connections between said supporting means and said table, extending parallel to but located entirely at one side of the path of travel of the film, said connections permitting the mending table to be turned on its pivotal connections from a position entirely out of the path of travel of the film, into said path of travel, whereby when the table is in inoperative position, the supporting means for the table are located entirely at one side of and out of the way of the film.

2. The combination with a rewinder for films, comprising a vertically disposed frame, and reel supporting means projecting on one side only of said frame, and means for effecting the winding of the film from one reel to the other, of a film mending table pivoted to the frame, by pivots extending parallel to and located entirely at one side of the line of travel of the film, said pivot being adapted to be swung into a horizontal position on either side of the frame, said table being provided with portions at one side of the path of travel of the film, for engaging a part of the frame adjacent to the pivots, to support it in operative position on the same side of the frame as the reel supporting means, whereby when the said table is in inoperative position, it will be on the opposite side of the frame from the reel supporting means and no part of the supports for said table will be in the way of the film between said reel supporting means.

3. The combination with a rewinder for films, comprising a vertically disposed frame, reel supporting means projecting on one side only of the same, and means for effecting the adjustment of the film from one reel to the other, of a film mending table provided at one end with downwardly extending lugs, pivotally connected to the frame by pivots extending parallel to the path of travel of the film, and located on the side of the frame opposite that from which the reel supporting means project, said table being capable of swinging into horizontal position on the side of the frame adjacent to and beneath the film, and engaging the top edge of the frame when in such position, said table being also capable of being swung into horizontal position on the opposite side of the frame and supported in such position by engaging a vertical face of said frame.

4. A film mending table consisting of a plate member adapted to be secured to a film rewinding frame, and provided with a knife slot, a knife pivotally secured to said plate member, to work in said slot, a clamping member for the overlapped ends of film sections to be joined, comprising a bar pivoted to said plate member, securing means for said bar, and a contact element movably secured to said bar, and having freedom of movement with respect thereto, to adjust itself to the overlapping film portions.

5. The combination with a film mending table having longitudinally disposed slots therein adjacent to one edge of the table, a movable plate located below said table and provided with projections extending through said slots, into position above the table to engage a film on said table, a clamping device connected with said movable plate, for clamping the film in engagement with said projections, means for adjusting said movable plate and clamping device longitudinally of the table, thereby moving said projections lengthwise of said slots, and clamping means for the film adjacent to the other edge of the table.

6. In a film mending device, the combination with a table, of a knife pivotally connected thereto, said table having longitudinally disposed slots on one slide of said knife, a movable plate below said table provided with film engaging projections extending through said slots, a film clamping member pivotally connected to said movable plate, means for adjusting said plate and clamping member longitudinally, said table being provided with film engaging projections, and a clamping plate coöperating therewith on the opposite side of said knife.

7. In a film mending device, the combination with a table, of a knife pivotally connected thereto, said table having longitudinally disposed slots on one side of said knife, a movable plate below said table provided with film engaging projections extending through said slots, a film clamping member pivotally connected to said movable plate, means for adjusting said plate and clamping member longitudinally, said table being provided with film engaging projections, and a clamping plate coöperating therewith on the opposite side of said knife, a clamping bar pivoted to the table adjacent to said knife, and a film pressing device for the overlapping portions of a mended film, pivotally connected with said clamping bar.

8. A film rewinder having an electrically energized lamp located directly below the normal horizontal plane of the film during its rewinding movement and non-inclosed on said rewinder, and a film inspecting table connected to said rewinder so as to swing over said lamp and laterally away from said lamp, said table having a transparent member located thereon to lie directly over the lamp when said table is positioned over the lamp.

9. A film mending table consisting of a member adapted to be secured to a film rewinder frame and provided with a knife slot, a knife pivotally secured to said member to work in said slot, a transparent member embodied in said member and having one edge located adjacent to the knife slot, a clamping member pivoted on said member to work against said transparent member, a contact element pivoted midway of its ends to the side of the clamping member and adapted to press a film snugly against the transparent member, and means for clamping a film portion on the opposite sides of the transparent member.

10. In combination, a film mending table having openings therein, a member located under said table and having pins to project through said openings to engage the sprocket holes of a film strip, a clamping element hinged to said member and having openings to receive the points of the pins and arranged to work against the upper side of the table, and means for shifting the member and element relative to said table.

11. A film mending table provided with a cutting knife, and a film clamping bar movable on said table, said clamping bar being provided with a pivotal contact bar adapted to press the film against the table.

12. In combination, a film mending table having openings therein, said table having pendant lugs on the sides thereof, a member located under each side of the table and having a pendant lug confronting the adjacent pendant lug of the table, each of said members having pins to project through said table openings and engage the sprocket holes of the film, a clamping element pivoted to each member and having openings to receive the points of the pins and arranged to bear against the upper side of the table, and a screw swiveled to each of the first named lugs and having threaded engagement with the adjacent lug to propel the member thereof.

In testimony whereof I affix my signature in the presence of two witnesses.

JACOB H. GENTER.

Witnesses:
PEARL M. VAN SCOY,
HELEN M. WEEKS.